Oct. 24, 1950 — R. E. DUCE — 2,526,735
POWDER DISPENSING APPARATUS
Filed Dec. 6, 1945
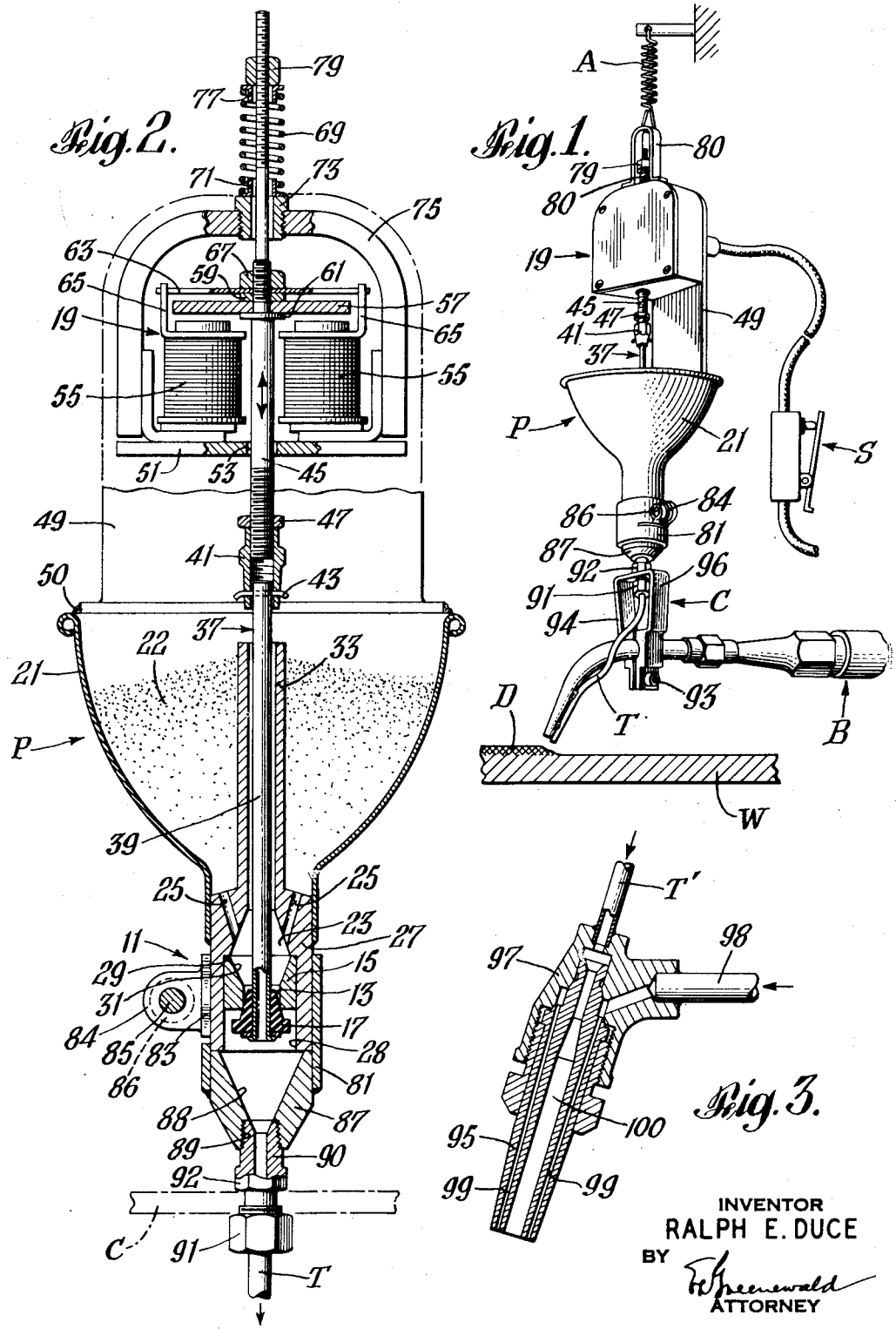
INVENTOR
RALPH E. DUCE
BY
ATTORNEY Patented Oct. 24, 1950

2,526,735

UNITED STATES PATENT OFFICE 2,526,735

POWDER DISPENSING APPARATUS

Ralph E. Duce, Kokomo, Ind., assignor, by mesne assignments, to Union Carbide and Carbon Corporation, a corporation of New York Application December 6, 1945, Serial No. 633,197

7 Claims. (Cl. 91—43)

This invention relates to powder dispensing apparatus, and more particularly to such apparatus for distributing powdered hard-facing material to a heated zone on a body of metal to which the powder is to be bonded.

For several years there has existed a process for increasing the wear resistance of a metal article by impregnating its surface or edge with particles of difficultly fusible abrasion-resistant diamond substitutes such as carbides, borides, or silicides, for example silicon carbide and tungsten carbide. One satisfactory method for hard-facing is to heat the surface of the metal article by the flame of an oxy-acetylene welding torch to produce either a sweating or a substantial melting of the surface, and then project particles of the wear resistant material against the surface within the area against which the welding flame impinges, with sufficient force to insure penetration of the particles into the molten surface metal. The particles may range in size from as coarse as through 30 mesh-on 40 mesh, to through 100 mesh-on 200 mesh. Among the metals which have been successfully hard-faced in this way are steel, bronze, aluminum, and the nickel alloy sold under the trade-mark "Monel" metal.

An object of the present invention is to provide novel apparatus for hard facing whereby the particles of hard-facing material are automatically distributed rapidly and uniformly to the heated surface of a metal body. Other objects are the provision of such apparatus which can be manipulated with ease by an operator; which can be taken apart easily and quickly for the repair or replacement of parts; and which is dependable in operation.

Other objects of the invention are the provision of a novel powder dispenser which is simple and compact, and performs dependably to supply a uniform rapid flow of powder; the provision of such a powder dispenser wherein moving parts are protected from contact with particles of abrasive material; and the provision of such a powder dispenser which can be used with different types and sizes of heating devices. Still other objects are the provision of a novel powder dispenser wherein the rate of powder flow can be adjusted; and which can be adjusted for dispensing different sizes of powder particles.

The above and other objects, and the novel features of the invention, will become apparent from the following description, having reference to the annexed drawing, wherein:

Fig. 1 is a perspective view showing one form of apparatus of the invention in position for depositing particles of hard-facing material upon a metal body;

Fig. 2 is a vertical mid-sectional view of a part of the apparatus shown in Fig. 1; and Fig. 3 is a vertical sectional view of a modified form of a part of the apparatus of the invention.

In accordance with the invention an automatic powder dispenser P is supported in any suitable way on a heating device, such as an oxy-acetylene welding blowtorch which has a tip adapted to be positioned near the surface of a workpiece W to direct a flame thereon. Powder dispenser P and blowpipe B are suspended as a unit by a coil spring A connected at its lower end to the top of the dispenser and at its upper end to any suitable support. A metal conduit T for conducting powdered hard-facing material leads downwardly from the bottom of dispenser P and has its lower end rigidly secured by silver soldering or otherwise to the tip of the blowpipe B in position to supply powder to a region on the workpiece W heated by the flame. Powder dispenser P may be secured to blowpipe B by the tube T alone, or an auxiliary clamp C may be used additionally when greater strength is required.

When deposit D of powdered tungsten carbide or other suitable powdered hard-facing material is to be laid and welded on the surface of a workpiece W, an oxy-acetylene flame from the blowpipe B is applied to the surface until the latter is brought to a mild sweat or shallow melt, depending on the amount of powdered metal to be deposited and the extent to which it is to be embedded in the surface metal. Flow of powder from the dispenser P is then started, and the blowpipe B is manipulated over the surface by the operator with a rotary or weaving motion to secure uniform heating and deposition of powder. Suspension spring A relieves the operator of a great deal of the weight of the apparatus as the work progresses and makes it possible to manipulate the apparatus as rapidly and easily as when using only a hand blowpipe in ordinary oxy-acetylene welding.

More in detail, as shown in Fig. 2 the preferred form of powder dispenser P is electrically actuated and comprises a holder 11 for a supply of powder having an outlet 13 in the bottom thereof, a valve seat 15 surrounding the outlet, a valve 17 movable rapidly toward and away from the valve seat, and mechanism 19 which actuates the valve so that powder flows through the outlet each time the valve is in open position. Valve actuating mechanism 19 also is constructed to vibrate the powder holder 11, so as to cause powders having poor flowing characteristics to be loosened from the main powder mass and flow through the outlet 13 each time the valve moves away from the seat.

Powder holder 11 comprises a large funnel-like container 21 for the main body of powder 22, and a relatively small chamber 23 below and spaced from the container 21, but connected therewith by a plurality of downwardly and inwardly sloping conduits 25, such as four, in such a way that powder from the mass 22 drops gradually under the influence of gravity into the small chamber 23. With this construction, the valve is relieved of the weight of the powder mass which otherwise might stall the valve. Chamber 23 and passages 25 are formed in a hollow cylindrical body or partition 27 having an upper portion fitting tightly within a neck constituting the lower part of the container 21. A cylindrical bore 28 in body 27 is open at its lower end and terminates at its upper end in an upwardly and inwardly sloping frusto-conical counterbore into which the lower ends of conduits 25 open. The bottom of chamber 23 is formed by a cylindrical valve seat bushing 15 fitting tightly within the bore 28 and abutting an annular shoulder 29. Bushing 15 has a frusto-conical counterbore 31 in the top thereof sloping downwardly and inwardly to the cylindrical outlet bore 13. Body 27 also has integral therewith a long tube or sleeve 33 extending centrally up through the container 21 and terminating at its upper end above the normal level of the powder 22, for a purpose to be described hereinafter.

Valve 17, which is formed of rubber or other deformable and resilient material which resists abrasion by powder particles trapped between the valve and seat, is positioned adjacent to and below the valve seat 15, and tapers upwardly and inwardly so that the upper portion of the valve fits within the outlet 13. A long valve stem 37 extends upwardly from valve 17 longitudinally of outlet 13 through the chamber 23, tube 33, and container 21, and terminates at its upper end a substantial distance above the container. Stem 37 comprises a lower section 39 over the top of which is secured an internally threaded coupling sleeve 41 by a pin 43 extending transversely through both the sleeve and the stem. Coupling sleeve 41 in turn is threaded over the lower end of an upper valve stem section 45 in such a way that by turning the sleeve 41 the lower and upper sections of the valve stem can be moved lengthwise with respect to one another for adjusting the size of the clearance space between valve 17 and valve seat 15 when the valve is in its uppermost position. A lock nut 47 can be tightened against sleeve 41 to hold the adjusted position.

The upper valve stem section 45 is an integral part of an electromagnetic vibrator mechanism 19 which may be of any standard design, operable by either A. C. or D. C. An example of such a vibrator is the A. C. electromagnetic vibrator manufactured by Edwards and Company, Inc., known as "No. 551." Vibrator 19 is mounted on an upstanding bracket 49 having a lower end welded or otherwise secured at 50 to the top rim of container 21. In general, the vibrator 19 comprises a base 51 having an aperture 53 for the valve stem section 45, and a pair of magnets 55 mounted on the base in position to attract an iron cross bar 57 which is secured on the upper valve stem section 45 by a nut 59 holding the cross bar against a flange 61 on the stem. When alternating current flows through the coils of the magnets 55 in one direction, the iron bar 57 is attracted and the valve 17 moved away from the valve seat 15. When alternating current flows through the coils of the magnets 55 in the opposite direction, the magnetic field is broken and a leaf spring 63 urges the valve upwardly. Leaf spring 63 is supported at its opposite ends in a pair of yokes 65 on opposite sides of the magnets 55, and is secured at its center to the upper portion of the upper valve stem section 45 by a clamping nut 67 holding the spring against nut 59. On 60 cycle alternating current, the valve 17 will reciprocate through a complete cycle toward and away from the valve seat 60 times each second.

The leaf spring 63 alone is not adjustable to vary the amplitude of vibration of the valve 17. Such variation is accomplished by a long coil spring 69 on the upper end of valve stem 37 which can be compressed or lengthened to decrease or increase the amplitude. The lower end of valve spring 69 rests on a spring plate 71 which in turn rests on a bushing 73, threaded into a central opening in the top of a supporting arch 75 which is secured to bracket 49; and the upper end of the coil spring 69 is provided with a second bearing plate 77 against which presses an adjusting nut 79 threaded on the upper end of the upper valve stem section 45 and movable upwardly or downwardly to decrease or increase the force exerted upwardly by the spring on the valve stem. An inverted U-shaped shield 80 fits over the top of the valve stem and is connected to the lower end of spring A.

When it is desired to decrease the amplitude of vibration or stroke of the valve 17 and to decrease the vibration of the hopper 21, the adjusting nut 79 is turned down to compress the spring 69, thus increasing the resistance of the bar 57 to the pull of magnets 55. When both the amplitude of movement or stroke of valve 17 and the vibration of hopper 21, are to be diminished, the adjusting nut 79 is screwed up to decrease the compression of the spring 69, thus decreasing the resistance of bar 57 to the pull of the magnets.

When powder is to be dispensed from the dispenser P, the position of valve 17 with respect to seat 15 is first adjusted by turning sleeve 41. Usually the adjustment is such that there is a slight clearance between the valve and seat when the valve is at the upper end of its stroke. The operator then closes by hand or foot the switch S, shown in Fig. 1, which closes an electrical circuit including the magnets 55 and causes the vibrator mechanism 19 to commence operating to reciprocate the valve stem 37 up and down, thus moving the valve 17 rapidly toward and away from the valve seat 15. Meanwhile powder is separating from the mass in container 21 and dropping through the conduits 25 into the lower chamber 23, much as sand flows in an hourglass. Each time the valve 17 moves away from the valve seat 15, the powder in the chamber 23 falls through the outlet 13 past the valve under the influence of gravity, to provide a substantially continuous and uniform powder flow. The inwardly and downwardly tapered walls of the counterbore 31, and the inwardly and upwardly tapered valve 17 permit the powder to flow smoothly from the chamber 23.

Uniform and substantially continuous powder flow has been obtained when the valve 17 has a stroke of only between $\frac{1}{16}$ and $\frac{3}{32}$ inch. The greatest range of powder feed rates is obtained by initially adjusting sleeve 41 so that valve 17 barely touches seat 15 in its uppermost position when spring 69 is fully compressed. Thereafter, lessening the compression of spring 69 increases the clearance between the valve and seat during each downward movement of the valve and increases the rate of powder discharge. When coarse powder is being dispensed, some clearance between the valve and seat is necessary when the valve is at the top of its stroke because coarse powder particles tend to become wedged between the valve and seat in any event, thus preventing full seating of the valve.

To prevent excessive frictional resistance of the mass of powder in container 21 from stalling the reciprocating valve stem 37, it is shielded from contact with the powder mass by the shielding tube 33 described previously. Tube 33 also prevents wear of the valve stem by the extremely abrasive grains of powder. The lower unshielded part of the valve stem 39 in the chamber 23 does not come in contact with a compact mass of powder so is not subject to much resistance or abrasion.

A free-flowing powder such as tungsten carbide, in any mesh size from through 24-on 36 to through 100-on 200, will flow continuously from container 21 into chamber 23 even if there is no vibration of the container. However, vibration is important for the proper feed of less free-flowing powders, such as coarser or less dense grains. Also, it sometimes helps to adjust valve 17 so it seats jarringly on seat 15.

The powder conveying tube T is coupled to the dispenser P by a hollow coupling sleeve 81 having an upper section 83 which is split lengthwise so that the sleeve will fit easily over the body 27. On opposite sides of the split there are outstanding ears 84 through both of which passes a bolt 85 carrying a nut 86 which can be tightened on the bolt to draw the two ears close together and tighten the sleeve 81 on the body 27. The lower portion of coupling sleeve 81 fits over and is welded to a reducer 87 having a conical counterbore 88 in the upper end thereof, and an internally threaded bore 89 in the lower end thereof into which is threaded a downwardly projecting nipple 90 externally threaded at its lower end to fit within a coupling nut 91 carried on the upper end of tube T. With this construction, it is a simple matter to disconnect the dispenser P from the tube T by loosening the bolt 85 so that the sleeve 81 can be withdrawn from the body 27.

When a suspension spring A for the powder dispenser P is employed, it is not always necessary to clamp the dispenser on the blowpipe B with an auxiliary clamp of the character shown at C in Fig. 1. However, if such a clamp is desired, one suitable type may have an inverted U-shape as shown in Fig. 1 and may have an aperture in its upper end fitting over the nipple 90. Clamp C is pressed against a flange 92 on nipple 90 by the coupling nut 91 to hold the clamp firmly in place. The lower portion of the clamp C comprises two legs 94 and 95 which fit over opposite sides of the stem of the blowpipe B and are clamped together on the stem by a coupling bolt 93 which passes through the portions of the legs below the stem.

The blowpipe B shown in Fig. 1, is a single-flame welding blowpipe of well-known design having tube T secured to its lower side. In some circumstances, it may be desirable to shift the position of the tube T either to the top or the lateral sides of the tip. Also, instead of using a single flame welding tip, a multi-flame tip may be used, especially when large surface areas are to be hard-faced or where the movement of the torch is mechanically controlled. Such a multi-flame tip 95 is shown in Fig. 3 mounted in a head 97 which is connected to a tube 98 for supplying an oxy-acetylene gas mixture to a plurality of annularly arranged passages 99 surrounding a central passage 100. Passage 100 is supplied with powdered hard-facing material by a tube T' connected to a powder dispenser of the type previously described herein.

Specific embodiments of apparatus have been described solely to illustrate the principles of the invention. It is to be understood that changes in the construction and relative arrangement of parts can be made within the scope of the invention as defined in the appended claims.

I claim:

1. A powder dispenser comprising a container for powder; means providing a chamber below and spaced from said container; said chamber having an outlet in the bottom thereof; a valve seat surrounding said outlet; a partition between said container and said chamber for supporting the weight of said powder, said partition having conduit means therethrough establishing communication between said container and said chamber for admitting powder to said chamber; a valve movable axially toward and away from said valve seat; and vibrator mechanism acting on said valve operable to vibrate said valve automatically toward and away from said valve seat axially thereof, whereby powder flows into said chamber and powder is released from said chamber each time said valve moves away from said seat.

2. A powder dispenser comprising a container for powder; means providing a chamber below and spaced from said container, said chamber having an outlet in the bottom thereof; a valve seat surrounding said outlet; a partition between said container and said chamber for supporting the weight of said powder, said partition having conduit means therethrough establishing communication between said container and said chamber for admitting powder to said chamber; a valve movable axially toward and away from said valve seat; a valve stem extending from said valve longitudinally of said outlet; vibrator mechanism acting on said valve stem operable to vibrate said valve automatically toward and away from said valve seat axially thereof, whereby powder flows into said chamber and powder is released therefrom each time said valve moves away from said seat; and means for adjusting at will the position of said valve with respect to said seat.

3. A powder dispenser comprising a container for a mass of powder; means providing a chamber below and spaced from said container, said chamber having an outlet in the bottom thereof; a partition between said container and said chamber for supporting the weight of said powder, said partition having conduit means therethrough connecting said container with said chamber; a valve seat surrounding said outlet; a valve movable toward and away from said valve seat; a valve stem extending from said valve up through said chamber and said container longitudinally of said outlet; vibrator mechanism acting on said valve stem operable to vibrate said valve and stem lengthwise of said stem automatically; and means projecting up from said partition in said container surrounding said stem and substantially excluding said mass of powder from contact with said stem.

4. A powder dispenser comprising a container for powder; means providing a chamber below and spaced from said container, said chamber having an outlet in the bottom thereof; a valve seat surrounding said outlet; a partition between said container and said chamber for supporting the weight of said powder, said partition having conduit means therethrough establishing communication between said container and said chamber for admitting powder to said chamber; a valve movable toward and away from said valve seat; a valve stem extending from said valve up through said chamber and said container longitudinally of said outlet; and vibrator mechanism mounted on said container operatively connected with said valve stem to vibrate said valve automatically toward and away from said valve seat lengthwise of said stem.

5. A powder dispenser comprising a holder for powder, having an outlet in the bottom thereof; a valve seat surrounding said outlet; a valve movable toward and away from said valve seat; a valve stem extending from said valve up through said holder longitudinally of said outlet; a support mounted on said holder; and vibrator mechanism carried by said support coacting with said valve stem to vibrate said stem lengthwise thereof whereby said valve is moved repeatedly toward and away from said seat, said mechanism including an electromagnetic device operable to move said valve away from said seat intermittently, and a coil spring having one end thereof bearing against said support and the other end thereof bearing against said stem, said spring holding said valve normally adjacent said seat and acting to restore said valve to its normal position after each movement thereof away from said seat.

6. A powder dispenser according to claim 5, also comprising means for adjusting the compression of said spring to vary the amplitude of movement of said valve.

7. A powder dispenser according to claim 5, wherein said valve stem comprises two sections coupled together and adjustable with respect to one another lengthwise of said stem, whereby to adjust said normal position of said valve with respect to said seat.

RALPH E. DUCE.

REFERENCES CITED

The following references are of record in the file of this patent:

UNITED STATES PATENTS

| Number | Name | Date |
| --- | --- | --- |
| 2,151,914 | Hopkins | Mar. 28, 1939 |
| 2,212,318 | Gee | Aug. 20, 1940 |
| 2,324,455 | Keim et al. | July 13, 1943 |
| 2,389,702 | Ullmer | Nov. 27, 1945 |